United States Patent [19]

Röhm

[11] Patent Number: 4,819,319

[45] Date of Patent: Apr. 11, 1989

[54] POWER CHUCK RETAINER FOR ROTATING SPINDLE

[76] Inventor: Günter H. Röhm, Heinrich-Röhm-Str. 50, D-7927 Sontheim, Fed. Rep. of Germany

[21] Appl. No.: 50,634

[22] Filed: May 14, 1987

[30] Foreign Application Priority Data

May 15, 1986 [DE] Fed. Rep. of Germany ....... 3616473

[51] Int. Cl.[4] .......................... B23B 19/00; B23Q 3/00
[52] U.S. Cl. ........................................ 29/568; 82/142; 82/165; 279/1 R
[58] Field of Search ...................... 29/568; 279/4, 1 R, 279/110, 121; 82/40 R, 28 R, DIG. 6, 30

[56] References Cited

U.S. PATENT DOCUMENTS 4,582,331  4/1986  Rohm ...................................... 279/4

FOREIGN PATENT DOCUMENTS

| 68795 | 5/1941 | Czechoslovakia ...................... 279/4 |
| 2324781 | 11/1973 | Fed. Rep. of Germany ...... 279/121 |
| 3045537 | 7/1982 | Fed. Rep. of Germany ..... 279/1 R |
| 3328291 | 2/1985 | Fed. Rep. of Germany . |
| 102402 | 8/1981 | Japan ..................................... 29/568 |
| 152508 | 11/1981 | Japan ..................................... 29/568 |

Primary Examiner—Joseph H. McGlynn
Assistant Examiner—Daniel W. Howell
Attorney, Agent, or Firm—Herbert Dubno

[57] ABSTRACT

In the clamping device a clamping head rigidly attached to the rotating spindle is provided between the rotating spindle and the tool holder which has a plurality of adjustable clamping pieces for holding the tool holder on the clamping head. A clamping rod penetrating the clamping head is provided for the tool holder in the hollow rotating spindle. This clamping rod is slidable axially under power operation, is coupled with a central clamping member of the tool holder and is rotatable relative to the rotating spindle. This clamping rod is couplable and uncouplable with the clamping member by rotation. A clamping pipe which is guided axially slidably and nonrotatably relative to the rotating spindle moves and adjusts the clamping pieces. The clamping rod is engaged in the rotation direction with the clamping pipe by the gear unit which converts the axial motion of the clamping pipe to a rotation of the clamping rod. Thus a sliding of the clamping pipe in the sense of a fixing and/or loosening of the tool holder on the clamping head rotates the clamping rod in the sense of a coupling and/or uncoupling to the clamping member.

3 Claims, 4 Drawing Sheets

POWER CHUCK RETAINER FOR ROTATING SPINDLE

FIELD OF THE INVENTION

My present invention relates to a clamping device or chuck retainer on the rotating spindle of a turning machine (e.g. a lathe) for a power-operated workpiece holder, particularly a chuck.

BACKGROUND OF THE INVENTION

The rotating spindle of a turning machine, e.g. a lathe, can have a power-operated workpiece holder, particularly a chuck. A clamping head attached to an end of the rotating spindle between the rotating spindle and the workpiece holder has a plurality of adjustable power-operated clamping members for clamping and fixing the workpiece holder on the clamping head and also with a clamping rod for the workpiece holder located in the hollow spindle traversing the clamping head which is axially slidable between two positions corresponding to the open or closed state of the workpiece holder under power, is attached with a central clamping member of the workpiece holder and is rotatable relative to the rotating spindle at least into a position corresponding to the open state of the workpiece holder. The clamping rod is couplable and decouplable from the clamping member by rotation.

In a clamping device or chuck retainer as described in German Open Patent Application No. 33 28 291 the power-operated clamping members are radial clamping bolts guided radially in the clamping head body. Power-pistons operating these clamping members are provided in cylindrical spaces in the clamping head body. A clamping cylinder with a rotary piston is provided for rotation of the clamping bar. It is arranged with axial pistons for axial operation of the clamping bar on the rear end of the rotary spindle axially beside an additional clamping cylinder. The cylinder piston unit for each clamping piece in the clamping head body and the clamping cylinder with rotary piston for rotation of the clamping bar involve considerable construction and operating or maintenance costs.

A clamping device or chuck retainer is described in German Open Open Patent Application No. 30 45 536 in which the clamping members are guided radially in the clamping head body and are adjustable by a clamping tube with a wedge drive which is slidable axially under power operation in the rotating spindle receiving the clamping bar and is nonrotatable relative to the rotating spindle. A coupling bar is provided for coupling and decoupling the tubelike with respect to the central clamping member of the workpiece holder which is guided inside the clamping bar axially slidable under power operation. The clamping bar and the coupling bar like the clamping tube are nonrotatable relative to the rotating spindle. Disadvantageously the coupling bar and three clamping cylinders with their own clamping pistons for the clamping tube, the clamping bar and the coupling bar are all necessary. Also the clamping cylinders occupy a disadvantageously large axial structural length at the rear end of the rotating spindle.

OBJECTS OF THE INVENTION

It is an object of my invention to provide an improved clamping device or chuck retainer on the rotating spindle of a turning machine or lathe for power operation of a workpiece holder, particularly a chuck, which overcomes drawbacks of earlier systems for mounting the chuck on the spindle of the lathe headstock.

It is also an object of my invention to provide an improved clamping device or chuck retainer on the rotating spindle of a turning machine or lathe for power operation of a workpiece holder which has a substantially simpler structure and operation than the devices previously available.

It is another an object of my invention to provide an improved clamping device or chuck retainer on the rotating spindle of a turning machine or lathe for power operation of a workpiece holder which results in a more compact space saving structure for the turning machine or lathe.

It is yet another object of my invention to provide an improved clamping device or chuck retainer on the rotating spindle of a turning machine or lathe for power operation of a workpiece holder in which only two simple axial drives on the rear end of the rotating spindle suffice to operate both the clamping tube and the clamping bar to provide axial clamping action as well as the rotary motion need for coupling its drive to the power chuck.

SUMMARY OF THE INVENTION

These objects and others which will become more readily apparent hereinafter are attained in accordance with my invention in a clamping device or chuck retainer mounted on the rotating spindle of a turning machine for a power-operated workpiece holder, particularly a chuck, comprising a clamping head attached to an end of the rotating spindle between the rotating spindle and the workpiece holder which has a plurality of displaceable power-operated clamping members for clamping and fixing the workpiece holder on the clamping head.

The chuck-mounting assembly also comprises a clamping bar for the workpiece holder located in the hollow drill spindle traversing the clamping head, which is axially displaceable between two positions corresponding to the open and/or closed state of the workpiece holder under power, is attached with a clamping member of the workpiece holder and is rotatable at least into a position corresponding to the open state of the workpiece holder relative to the rotating spindle. The clamping bar can be coupled to and decoupled from the clamping member by rotation.

According to my invention a power-operated clamping tube receiving the clamping bar is guided axially slidably and nonrotatably relative to the rotating hollow spindle on the rotating hollow spindle to displace the clamping members and the clamping bar is engaged for rotation in the rotation direction thereof with the clamping tube by a drive unit, which in the position of the clamping bar corresponding to the open state of the workpiece holder converts the axial motion of the clamping tube into a rotary motion of the clamping bar, sliding the clamping tube in the sense of a tightening and/or loosening of the workpiece holder on the clamping head rotating the clamping bar in the sense of coupling and decoupling to the clamping member.

As a result in the clamping device or chuck retainer according to my invention the displacement of the clamping tube axially operating the clamping members by the drive unit forces the clamping bar rotation causing the coupling and decoupling of the clamping bar to the clamping member so that a separate power drive unit is not needed for this clamping bar rotation. The axial drive for the clamping tube which also rotates the clamping bar by the drive unit suffices so that this one axial drive for the clamping bar and clamping tube performs all required motions of the clamping bar and clamping tube. Thus the coupling between the clamping bar and the clamping member closes and opens simultaneously with mounting of the workpiece holder on the clamping head or dismounting so that no additional securing devices or elements are required.

Preferably, the clamping bar is prevented from rotating in the course of its axial displacement from the position corresponding to the open state of the workpiece holder to the position corresponding to the closed state of the workpiece holder in a rotary position corresponding to decoupling from the clamping member. Thus the clamping bar is prevented from rotation by action of the drive unit in a particularly easy way.

Thus the coupling between the clamping bar and the clamping member can not be loosened as long as the clamping member and thus the workpiece holder is operated by the clamping bar.

The invention can have a particularly simple structure when the clamping bar has a coupler piece for coupling with the clamping member which is rotatable and is attached by the drive unit alone with the clamping tube.

The coupler piece is connectable in a rotary coupling transmitting pulling and pushing forces to the clamping bar guided nonrotatably in the rotating spindle. This has the advantage that the clamping bar can be attached rigidly and nonrotatably with the power piston axially operating it and also this power piston need not be rotatable in the associated cylinder housing.

The rotary coupling has a circular flange directed inwardly to the clamping bar and a plurality of connecting studs distributed around the circumference thereof protruding outwardly toward the coupler piece.

This circular flange has a plurality of recesses for axial passage of the connecting studs, the circumferential angular spacing of the connecting studs and/or the recesses from each other being greater than the angle about which the coupler piece rotates in coupling and decoupling the clamping member.

The clamping bar and its coupler piece can be mounted then in each other by axial insertion and a connecting rotation. The connecting studs can enter in a circular groove axially behind the circular flange through cavities or recesses in the flange and then cannot in any case be pulled out when the coupler piece is rotated for coupling and decoupling the clamping member.

The drive unit can be formed between the clamping tube and the clamping bar and/or its coupler piece in a variety of different ways. Preferably the drive unit comprises a positioning cam provided on the clamping bar and/or the coupler piece and a positioning piece protruding toward the clamping bar and/or the clamping head rigidly attached to the inside of the clamping tube, the positioning piece moving along the positioning cam when the clamping tube is axially shifted.

Since the clamping tube is guided nonrotatably on the rotating spindle, the rotation of the clamping bar and/or the coupler piece is determined from the course of the positioning cam on the longitudinal and circumferential direction on the clamping bar and/or the coupler piece.

Understandably it is, alternatively, possible to provide the positioning piece on the clamping bars and/or the coupler piece and the positioning cam on the clamping tube.

Advantageously the positioning cam can be made by a plurality of secants positioned next to each other in the axial direction and increasing on rotation about the axis of rotation on the outside of the clamping bar and/or the coupler piece through the outer surface of the coupler piece or the clamping bar. The rotation angle between the first and the final secant of the outer surface can be equal to the angle of rotation required for coupling and decoupling the coupler piece and/or the clamping bar to or from the clamping member and the positioning piece can be convex inwardly toward the clamping bar and/or the coupler piece can have a top line contacting on the outer surface and running along the secant. In this way the unit has a suitably large length in the direction of the secant between the positioning piece and the outer surface which is advantageous for reduced wear on the outer surface and the positioning piece and for torque transfer to the clamping bar and/or the coupler piece.

Further my invention can be provided so that a planar locking surface connects axially to an end of the outer surface, which goes through the secant producing the end of the outer surface and which contacts the positioning piece for preventing the rotation of the coupler piece and/or the clamping bar. Advantageously the axial length of the planar locking surface is at least equal to the axial displacement of the clamping bar between two positions corresponding to the open and/or the closed state of the workpiece holder.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
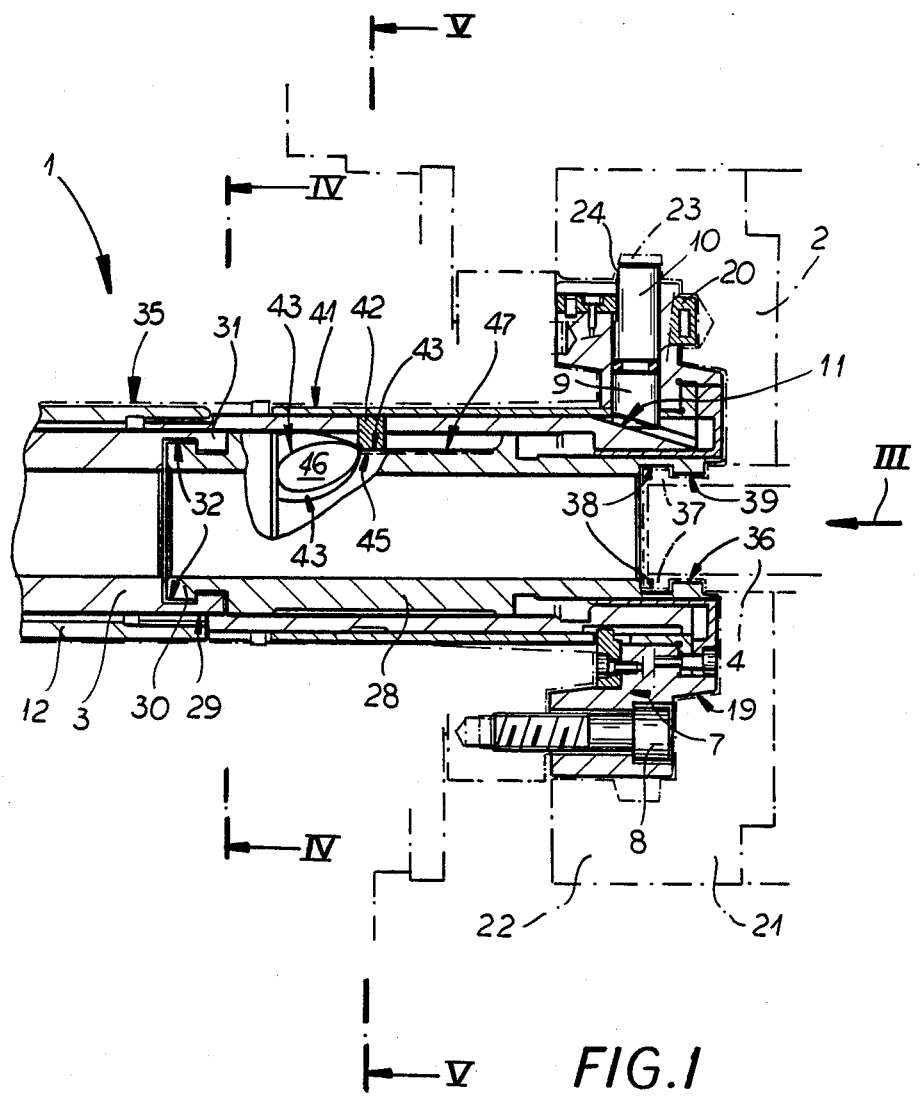
FIG. 1 is an axial cross sectional view through the front portion of a rotating spindle with the clamping head and the only partially shown workpiece holder of the turning machine shown with dot-dashed lines.

In FIG. 1 the power-operated chuck attached to the front end of the rotating spindle 1 which is the workpiece holder 2 in this example is indicated partially with dot-dashed lines since the invention does not depend on the special structure of the workpiece holder 2 in as much as this workpiece holder 2 has a central axially displaceable clamping member 4 to be operated by the clamping bar 3 only for operation of its clamping elements, particularly its clamp jaws.

Figure 2:
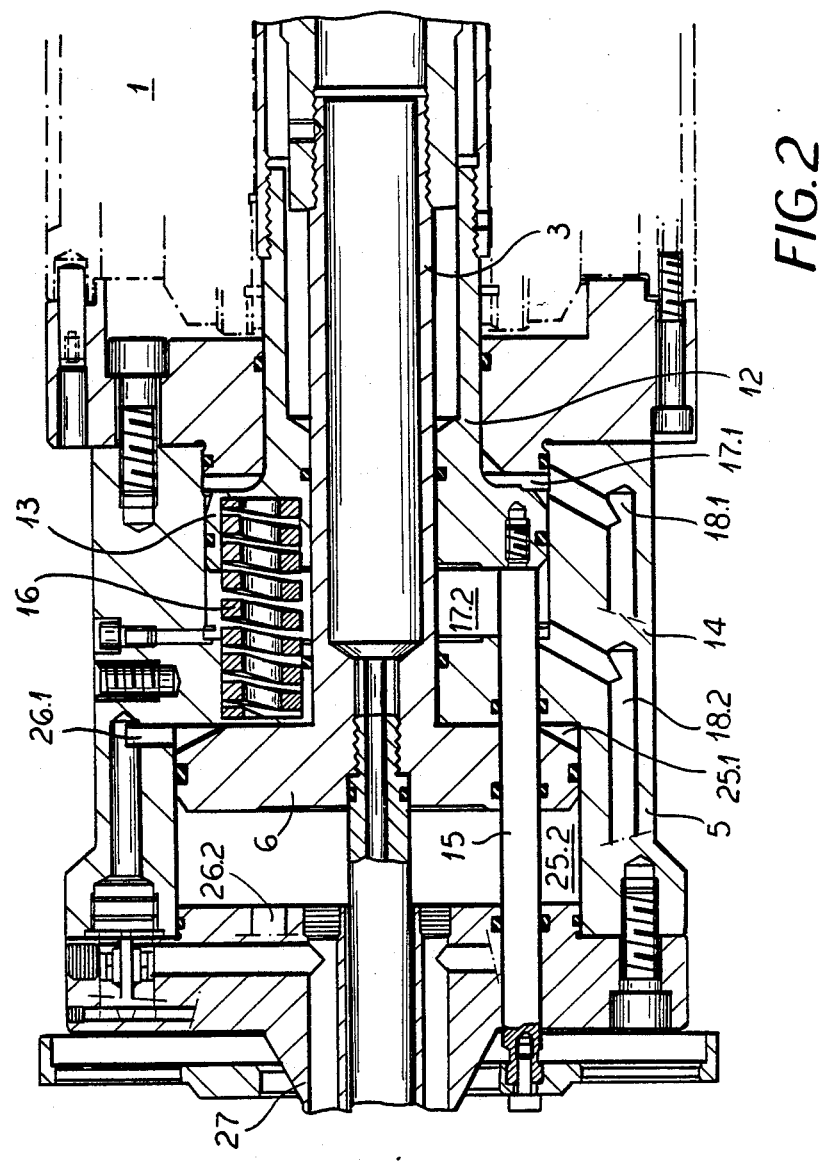
FIG. 2 is an axial cross sectional view through the rear end of the rotating spindle with the clamping cylinder without the associated force distributor of the turning machine.

A clamping cylinder 5 is connected to the rear end of the rotating spindle end in FIG. 2. Its axial piston 6 is connected with the clamping member 4 of the workpiece holder 2 by the clamping bar 3 positioned in the hollow rotating spindle 1.

A clamping head 7 is provided between the front end of the rotating spindle 1 and the workpiece holder 2. Its clamping head body is screwed by means of axially directed bolts 8 on the spindle end and is penetrated by the clamping bar 3 through its center opening.

The clamping head 7 has a plurality of radially directed clamping bolts each like clamping piece 9 with bolt heads 10 projecting beyond the circumferential surface of the clamping head 7 to the exterior.

The location of the clamping members 9 by which the workpiece holder 2 is rigidly clamped to the clamping head 7 is shown in the drawing.

The clamping members 9 are displaceable by a wedge drive 11 by a power-operated clamping tube 12 which is guided axially slidable in the hollow rotating spindle 1 and receives clamping bar 3.

The clamping tube 12 is secured against rotation relative to the rotating spindle 1. In particular the clamping tube 12 is connected to the power-piston 13 of a clamping cylinder 14 for axial powered operation and is secured against rotation in the associated cylinder housing by a guide bar 15. The clamping members 9 extend radially outwards in the displaceing direction of the clamping tube 12 which also is to the right in FIG. 2.

The clamping tube 12 is biased by the force of the compressible spring 16. The cylindrical space 17.1 found to the right of the power piston 13 in FIG. 2 can be acted on with a pressurizing medium (e.g. a hydraulic fluid) in a passage 18.1 to move the clamping tube 12 to the left against the force of the compressible spring 16 and because of that the clamping piece 9 can be drawn in radially in the clamping head 7 toward the interior when the workpiece holder 2 is to be loosened from the clamping head 7. Also the cylindrical space 17.2 found to the left of the power piston 13 in FIG. 2 can be provided with a pressurizing medium through the passage 18.2 for power operation.

The pressurizing medium acted on by the power piston 13 then augments the force due to the compressible spring 16.

The clamping head 7 is provided on its end facing the workpiece holder 2 with a centering means in the form of a short tapered sleeve 19 for the workpiece holder 2 which corresponds to a sleeve receptacle in the workpiece holder 2.

Moreover the front end of the clamping head 7 is provided with at least one pin 20 which engages in a corresponding pin cavity in the workpiece holder 2 to secure it from rotating relative to the clamping head 7.

The sleeve receptacle and the pin cavity are located in the workpiece holder flange 21.

The workpiece holder flange 21 has a collar 22 overlapping the clamping head 7 exteriorly axially and inwardly toward the rotating spindle 1. The collar 22 is formed with a circular groove for engagement of the bolt heads 10 provided in the clamping members 9 on the rear side wall 24 which is opens toward the rotating spindle 1, provides clamping surfaces for the bolt heads which are conical. This collar 22 engages the bolt heads 10 with inclined clamping surfaces so the workpiece holder flange 21 is pulled by the clamping surfaces and the collar 22 axially against the clamping head 7 and is centered by the radial directed pressing clamping members 9 on the short tapered sleeve 19.

The tubelike axial power piston 6 rigidly attached to and operating the clamping bar 3 is secured against rotation by the guide bar 15.

The cylindrical spaces 25.1 and 25.2 to the right and left of the axial power piston 6 are acted on by a pressurizing medium through the passages 26.1 and 26.2 according to the desired operating direction of the axial power piston 6 and/or the clamping bar 3.

The feed of the pressurizing medium to the passages 18.1, 18.2 and spaces 26.1 and 26.2 is effected by a fluid distributor means not shown in detail which sits on a connector tube 27 of the cylinder housing 5 shown only broken away. Such distributors are standard in the art and thus requires no illustration.

The clamping bar 3 is provided with a coupler piece 28 for coupling to the clamping member 4 which is connected by a pull or push transmitting rotary coupling 29 to the clamping bar 3 guided nonrotatably in the rotating spindle 1.

This rotary coupling 29 is partially formed by connecting studs 30 on the coupler piece 28 which are distributed over its circumference directed outwardly from the coupler piece 28.

On the coupler piece 3 the rotary coupling 29 is partially formed by a radially inwardly directed circular flange 31 so that a circular groove 32 arises on the inside of the hollow clamping bar 3.

Figure 5:
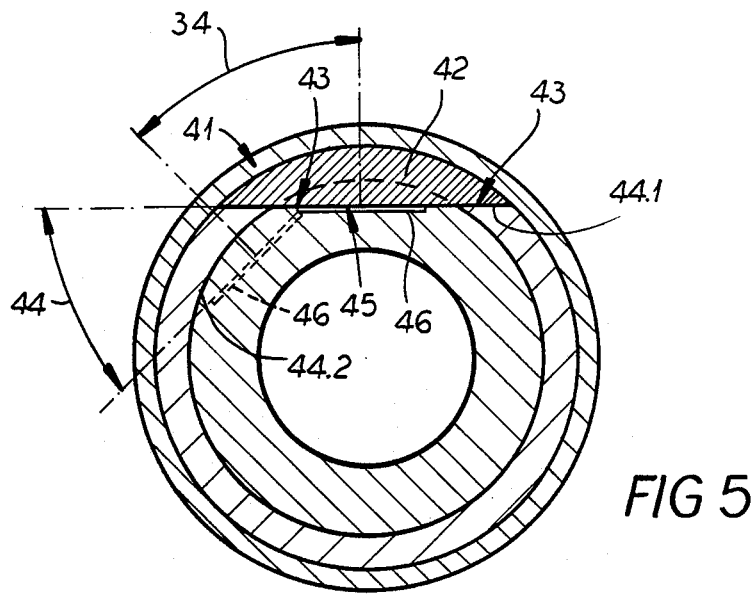
FIG. 5 is a cross sectional view of the device of FIG. 1 taken along the section line V—V thereof.

The circular flange, 31 has a plurality of recesses 33 for axial passage of the connecting studs 30 to form a bayonet coupling therewith. Their angular spacing in the circumferential direction amounting to about 90° is greater than the angle indicated in FIGS. 3 to 5 as 45° through which the coupler piece 28 is rotated into and out of coupling on the clamping member 4 in a way to be described below. This latter rotation can thus not result in the connecting studs 30 again registering with the recesses 33 so that they can be axially withdrawn from the circular groove 32 through the recesses 33. Also the clamping tube 12 because it simplifies construction and mounting is formed in two parts axially. Thus both clamping tube members are connectable nonrotatably with each other and cannot be pushed into or pulled away from one another.

The coupler piece 28 is attached by another rotary coupling 36 with the clamping member 4. This coupling 36 is couplable and uncouplable by rotation of the coupler piece 28 and is constructed like the rotary coupling 29 as a bayonet coupling.

It comprises coupling lugs 37 directed outwardly on the clamping member 4 distributed around the circumference of the coupling and a circular groove like coupling recess 38 in the coupler piece 28 which has inwardly projecting coupling projections 39 directed radially on its clamping member side.

In the rotational position corresponding to the uncoupled state of the coupler piece 28 the coupling lugs 37 can be guided in the gaps 40 between the coupling projections 39 axially into the coupling recess 38.

In the coupling recess 38 the clamping member and coupler piece are rotatable relative to each other until the coupling lugs 37 engage axially below the coupling projections 39 in the position of the coupler piece 28 corresponding to the coupled state.

Figure 3:
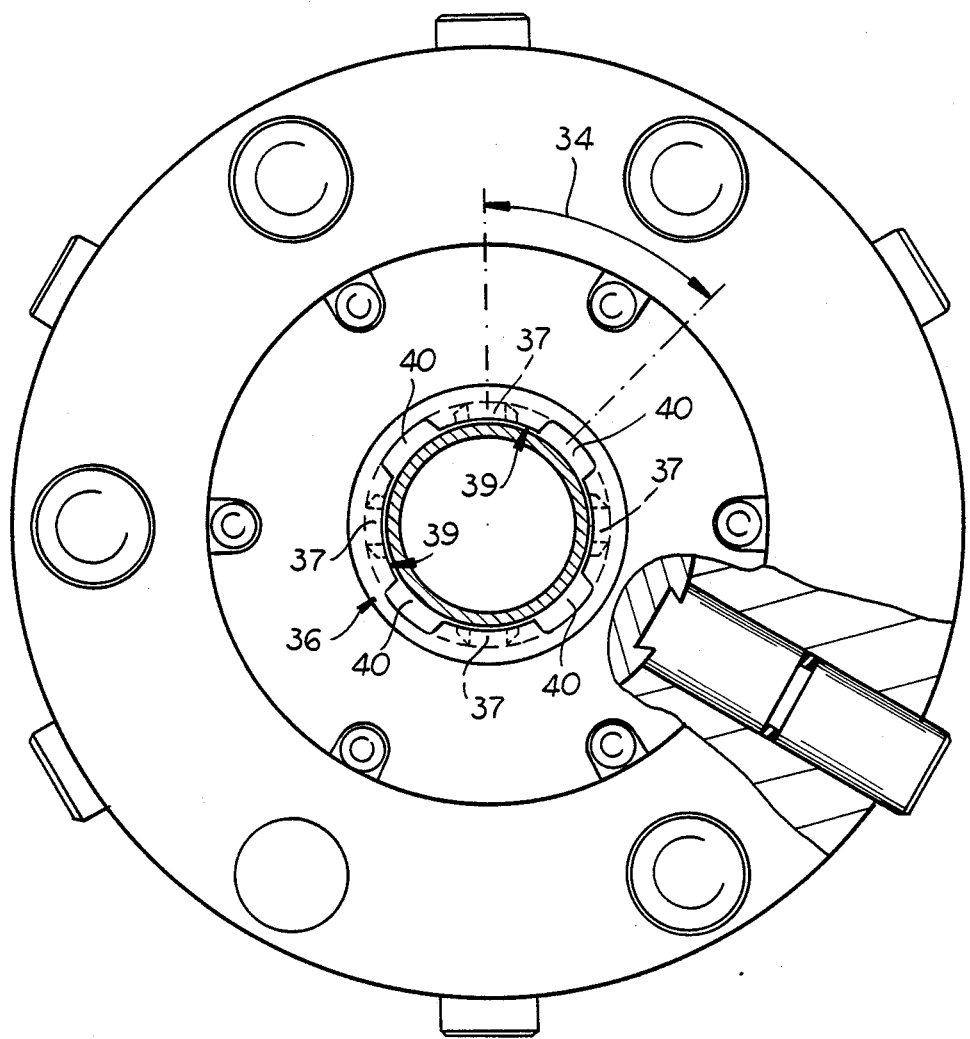
FIG. 3 is an end elevational plan view of the clamping head seen in the direction of the arrow III of FIG. 1 with workpiece holder removed and partly broken away.
Figure 4:
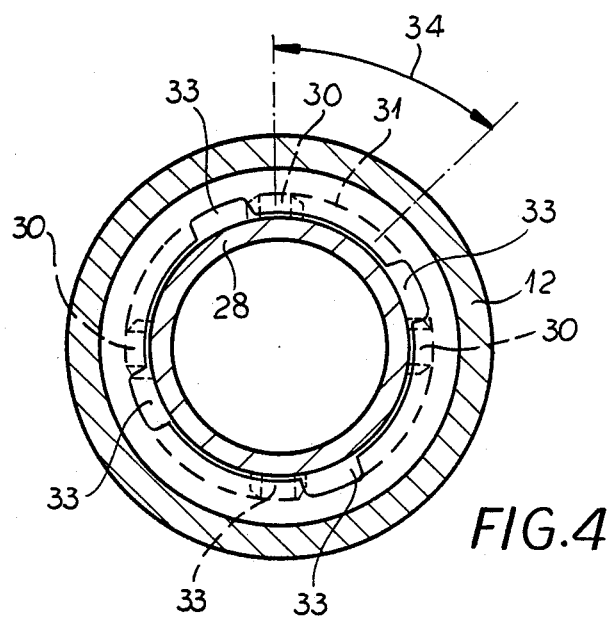
FIG. 4 is a cross sectional view through the device of FIG. 1 taken along the section line IV—IV thereof.

As seen in FIG. 3 the coupling projections 39 which remain between them, the gaps 40 allowing passage of the coupling lugs 37 and the coupling lugs 37 are shown with dot-dashed lines.

The coupler piece 28 is connected in rotation with the clamping tube 12 by a drive unit 41 which converts the axial motion of the clamping tube 12 into a rotary motion of the coupler piece 28 in the axial postion of the clamping bar 3 shown in FIGS. 1 and 2 in the corresponding open state of the workpiece holder 2.

In particular a sliding of the clamping tube 12 in the sense of a fixing and/or loosening of the workpiece holder 2 on the clamping head 7 causes a rotation of the coupler piece 28 in the sense of a coupling or decoupling to the clamping member 4.

FIGS. 1 and 2 show the state in which the clamping tube 12 is in its axial position which holds the workpiece holder 2 on the clamping head 12. The clamping tube 12 must be moved to the left from that position shown in FIGS. 1 and 2 when the workpiece holder 2 is to be loosened from the clamping head 7.

The coupler piece 28 is, as already mentioned, in its rotation position corresponding to the uncoupled state on the clamping member 4 axially however still corresponding to the position corresponding to the open state of the workpiece holder 2. Should the workpiece holder 2 be closed, the clamping bar 3 is moved from the axial position shown in FIGS. 1 and 2 to the left.

In particular the drive unit 41 between the clamping tube 12 and the coupler piece 28 is formed by a positioning piece 42 provided attached to the inside of the clamping tube 12 projecting against the coupler piece 28 and by a positioning cam provided on the coupler piece 28 on which the positioning piece 42 runs during axial positioning of the clamping tube 12.

The positioning cam is produced on the outside of the coupler piece 28 through the outer surface 43 by a plurality of secants next to each other axially and increasing on rotation of the parts opposing each other about the spindle axis. The angle of rotation 44 between the first secant 44.1 and the final secant 44.2 of this outer surface 43 is equal to the rotation angle 34 necessary for coupling and decoupling the coupler piece 28 with the clamping member 4.

The positioning piece formed convex inwardly to the coupler piece 28 in an axial cross section corresponding to FIG. 1 has a crown line 45 traversing on the secants and contacting the outer surface 43 so that the positioning piece 42 can contact on the outer surface 43 over the entire length of this crown line 45. However in the example the outer surface 43 has a central surface opening 46 so that the crown line 45 of the positioning piece 42 occurs on the outer surface 43 only on its outer portion. The opening 46 can act as a lubricant supply means.

On the right end of the outer surface 43 in FIG. 1 where the positioning piece 42 contacts on the first secant 44.1, when the coupler piece 28 is in its rotary position corresponding to the coupled state on the clamping member 4, it connects axially a planar locking surface 47 which extends to the secant 44.1 at this outer surface end and on which the positioning piece 42 lies when the clamping bar 3 and thus the coupler piece 28 are moved to the left in FIGS. 1 and 2, i.e. in the sense of closing of the workpiece holder 2.

This has the result that the coupler piece 28 in the course of its motion from the position corresponding to the open state of the workpiece holder to position corresponding to the closed state of the workpiece holder is locked preventing its rotation in a rotary position corresponding to it being coupled to the clamping member 4.

This presupposes that the axial length of the planar locking surface 47 is at least equal to the displacement of the clamping bar 3 and/or the coupler piece 28 between the two configurations corresponding to the open and the closed state of the workpiece holder.

When as a result the clamping tube 12 moves to the left in the sense of a loosening of the workpiece holder from the clamping head 7 with the position of the clamping bar 3 and/or the coupler piece 28 axially unchanged, the coupler piece 28 rotates over the drive unit 41 in such a rotation direction and so far that the coupling 36 between it and the clamping member opens, i.e. the coupling lugs 37 come into coincidence with the gaps 40 so that at the end when the clamping members 9 are radially drawn into the clamping head 7.

Then the workpiece holder 2 can be removed axially from the clamping head 7. To mount a fresh workpiece holder 2 on the clamping head 7 the clamping tube 12 is again moved to the right.

The drive unit 41 moves the clamping members radially and rotates the coupled piece 28 so that the coupling 36 closes with the clamping piece 4, the coupling lugs 37 again arrive behind the coupling projections 39 and take the position shown in FIG. 3 relative to the gaps 40.

When in this way the workpiece holder 2 is attached to the clamping head 7 and the coupler piece 28 coupled to the clamping member 4, the clamping bar 3 and the coupler piece 28 can be moved to the left for closing the workpiece holder 2.

The positioning piece 42 slides along the locking surface 47 and prevents each further rotation of the coupler piece 28 so that the drive unit 41 locks the coupler piece 3 from further rotation.

I claim:
1. A chuck assembly for rotary lathe spindle, comprising:
    a power-operated chuck;
    a head mounted at one end of said spindle and provided with:
    means for centering said chuck on said spindle;
    a plurality of chuck-engaging radial pins displaceable into and out of locking engagement with said chuck; and
    a wedge drive receiving an axial displacement for shifting said pins radially, said chuck having a power-actuating element extending axially through said head;
    a first actuator extending through said spindle and provided with a rotary bayonet coupling connecting said first actuator with said power-actuating element, said rotary coupling comprising a pair of relatively rotatable members axially interconnected in one position for transmitting axial force from said first actuator to said power-actuating element and being detachable in another position for separation of said power-actuating element from said first actuator;
    a second actuator extending through said spindle and connected to said wedge drive for axially displacing said wedge drive;
    respective fluid-powered members at an opposite end of said spindles operatively connected to said first and second actuators for displacing same; and
    means operatively connecting said second actuator with said coupling for releasing said element from said first actuator upon displacement of said second actuator to enable retraction of said pins from engagement with said chuck to enable release thereof from said head.

2. The apparatus defined in claim 1 wherein said power-actuating element and said head are axially interconnected in one axial position for transmitting axial force from said first actuator to said chuck and is detachable in another axial position for separation of said chuck from said power-actuator element, said axial positions are correspondent to the axial positions defining interconnection and separation of said power-actuating element and said first actuator.

3. The apparatus defined in claim 2 wherein said said means operatively connecting said first and second actuator is a gear unit preventing said power-actuating element from rotation relative to said spindle, said gear unit comprises:
- a positioning cam defined by a plurality of secants axially adjacent one another, and
- a positioning piece rigidly connected with said second actuator, said positioning piece running along said cam during an axial movement of said second actuator converting the axial movement thereof into a rotary motion of said power-actuating element and defining said positions for interconnection and separation of said power-actuating element from the first actuator.

* * * * *